United States Patent [19]

Frobenius

[11] 4,104,990

[45] Aug. 8, 1978

[54] PROCESS AND APPARATUS FOR DETERMINING ENGINE OPERATION NEAR THE LEAN-RUNNING LIMIT

[75] Inventor: Wolf-Dietrich Frobenius, Asperg, Fed. Rep. of Germany

[73] Assignee: Robert Bosch GmbH, Stuttgart, Fed. Rep. of Germany

[21] Appl. No.: 659,539

[22] Filed: Feb. 19, 1976

[30] Foreign Application Priority Data

Feb. 19, 1975 [DE] Fed. Rep. of Germany ....... 2507139

[51] Int. Cl.² ............................................. F02B 3/00
[52] U.S. Cl. ................................ 123/32 EA; 73/116; 73/117.3; 73/650; 364/442
[58] Field of Search ...... 123/32 EA, 119 ED, 117 D; 73/116, 117.3, 70.1, 35; 235/150.2, 150.21

[56] References Cited

U.S. PATENT DOCUMENTS

| 3,789,816 | 2/1974 | Taplin ..................................... 73/116 |
| 3,820,386 | 6/1974 | Grikscheit ............................... 73/116 |
| 3,908,616 | 9/1975 | Sasayama .......................... 123/117 D |
| 3,972,230 | 8/1976 | Hanson .................................... 73/116 |
| 3,996,911 | 12/1976 | Canup ............................. 123/117 D |

Primary Examiner—Ronald B. Cox

Attorney, Agent, or Firm—Edwin E. Greigg

[57] ABSTRACT

The fuel injection control pulses of an internal combustion engine may be shortened or lengthened to provide operation of the engine at a definite fuel-air ratio. When operation takes place in a leaned-out region, the engine suffers dynamic instability, resulting in rapid fluctuations of the rotational crankshaft velocity, superimposed on regular, periodic changes due to compression changes.

The crankshaft speed is tested at two different locations of the angular path by passing markers in front of an inductive transducer. The output signal from this transducer gates the counting input of a digital counter which is supplied with a pulse train at a constant, high frequency. A flip-flop alternately causes upward and downward counting in the counter so that a net difference of counted pulses is formed after each two successive counting periods. This difference is normally positive but, when irregular fluctuations in the crankshaft speed occur due to the effects of leaned-out operation, these differences may be negative. The most significant bit of the counter indicates this condition and the frequency of its occurrence is integrated and used as a signal to adjust the fuel injection pulses.

7 Claims, 3 Drawing Figures

PROCESS AND APPARATUS FOR DETERMINING ENGINE OPERATION NEAR THE LEAN-RUNNING LIMIT

BACKGROUND OF THE INVENTION

The invention relates to a process and to an apparatus for the acquisition of operational data levels heralding the imminent approach to a given pre-determined upper lean-running limit during the operation of an internal combustion engine, specifically for the regulation of the internal combustion engine within the region of excess air, ($\lambda > 1$).

At the present time, increased efforts are directed to permit internal combustion engines to function within preferably that operating range where the quantity of the harmful components of the exhaust gases can be kept small, and/or where the fuel consumption can be kept low, in order to meet the ever more stringent environmental rules regarding engine exhaust gases, and to respond to the challenge of the general shortage of fuel.

These requirements may be met by supplying the internal combustion engine with a comparatively lean fuel-air mixture, i.e., to tend toward combustion engine settings in the direction of a lean mixture, since operation in that region assures exhaust gases which are relatively free of harmful substances, and also assures low rates of fuel consumption. The precise determination of the operational point constituting the upper limit of the lean-running region is, therefore, of substantial significance, in order that the internal combustion engine may be operated under the constraint of the maximum admissible value, which differs for different engine rpm. As a result, it is of substantial significance that the operational point constituting the limit of the lean-running region be very accurately determined, and this determination can be based, for example, upon the fluctuations in the cyclic pressure patterns in the individual cylinders of the internal combustion engine. It is known that the dynamic stability (smoothness) of an internal combustion engine suffers, and becomes proportionately more disturbed, as one departs from an approximately stoichiometric relationship ($\lambda = 1$). In the present case, only the departure which is in the direction of the region of excess air ($\lambda > 1$) has any substantial significance.

To clarify these matters, FIG. 1 depicts the curve I of the normal compression pressure of a combustion engine, having four cylinders in the example of the present embodiment, plotted over an axis corresponding to the respective angular position of the crankshaft. It may be seen that the pressure rises at or near zero degrees, i.e., as the piston approaches its top dead center, and that work must be expended to continue the motion past top dead center. The same thing happens at a crankshaft angle of 180 degrees, when another piston of the four-cylinder engine reaches its top dead center. A graph of this kind may be obtained from a four-cylinder combustion engine by shutting off the ignition, or by interrupting the fuel delivery, and by cranking the engine with the starter.

During normal engine operation, that is to say, when both the fuel-air mixture and the ignition are supplied, a further pressure-surge takes place in the corresponding cylinder after a given piston moves through its top dead center, as portrayed by curve II in FIG. 1. It should be noted that the curves in FIG. 1 are merely qualitative representations; the afore-mentioned pressure surge is the result of the combustion of the fuel-air mixture and produces a turning moment (torque) upon the crankshaft, thereby accelerating its angular motion further. The crankshaft's rotational velocity $\omega$, represented by curve III in FIG. 1, is a function of the power strokes of the internal combustion engine. The curve III shows that the rotational velocity of the crankshaft is subject to cyclic fluctuations; the magnitude of the rotational velocity $\omega$ is lowest (Region T1) before and during a given piston's arrival and presence at the top dead center position, whereas it is highest in the region T2, and continually decreases thereafter until the sequentially next piston arrives at its top dead center, in another cylinder. Since a four-cycle, four-cylinder internal combustion engine yields two power-strokes for each single revolution of the crankshaft, FIG. 1 accurately reflects the corresponding periodic $\omega$-fluctuations of the crankshaft. As noted, these periodic fluctuations are functions of the rotating masses, and of the cyclic power sequences of the individual cylinders, whereby, as may be easily deduced, the amplitude of these periodic $\omega$-fluctuations decreases as the engine speed (rpm) increases, since the power strokes occur ever more frequently, thus leaving less and less time for any reduction in the rotational velocity of the crankshaft. It is to be noted here, however, that this particular decrease of the $\omega$-fluctuations is not linear. The periodic $\omega$-fluctuations shown in FIG. 1 correspond, therefore, to some given crankshaft or engine rpm and occur, moreover, for a fuel-air mixture where the air number $\lambda$ is approximately equal to 1.

When the operating conditions of the combustion engine approach the operational limit within the region of excess air, (lean-running limit), strong fluctuations are produced in the ignition delay and in the combustion behavior which, in turn, cause momentary fluctuations in the angular speed of the crankshaft. Thus, in addition to the afore-mentioned periodic $\omega$-fluctuations, further irregular $\omega$-fluctuations, occur resulting in a more complex influence on the dynamic behavior of the rotational velocity of the crankshaft. Solely for those operational conditions where $\lambda$ is approximately equal to 1, and where the combustion progresses essentially uniformly and without delay, do the periodic $\omega$-fluctuations predominate; the farther one enters into the region of excess air, the more do the irregular fluctuations outweigh the periodic fluctuations, i.e., the more erratic is the running of the internal combustion engine. The invention permits derivation of a signal which is representative of this erratic running of the engine, and this signal can be employed in the regulation and control of a particular operating point of the combustion engine.

However, in order to be in a position to accomplish this regulation, it is necessary to compare this measurable absolute magnitude of the erratic or "rough" running condition, (i.e., the dynamic instability) with an additional reference value, and to obtain a signal which can then be used for the regulation of the engine operation. The acquisition of this reference value, that is to say, of that value which represents a just admissible rough running condition, is not easy, because the reference value is itself a function of the engine rpm, and is neither constant nor linear.

OBJECT AND SUMMARY OF THE INVENTION

It is a principal object of the present invention to specify a process for the acquisition of a measured variable, serving as an indication of the imminent approach to the lean-running limit of an internal combustion engine. This process renders superfluous the generation of a special reference signal related to engine rpm.

This object is attained, according to the invention, by departing from the process described above and by measuring a combustion-dependent dynamic variable, preferably the rotational velocity $\omega$ of the crankshaft, for at least two different angular positions of the crankshaft during each revolution. The novel process further provides that a sequence of signal pulses, proportional in length to the measured variable, is variously fed to an Up/Down counter, once as an up-counting pulse sequence, and once as a down-counting pulse sequence. The remainder in the counter output is evaluated after the completion of each down-count and forms a measurement of the dynamic stability of the engine.

In this manner, it is feasible to relate the engine roughness, or dynamic instability, which attends lean mixtures, to the dynamic fluctuations due to structural conditions and manifested by the periodic $\omega$-fluctuations. In other words, the measurement and evaluation process alone suffices to produce a comparison between the reference value and the measured value while the periodic $\omega$-fluctuations are inherently incorporated in the reference value at any rpm. Thus it is unnecessary to change the reference value as a function of the rpm, since that functional relationship is intrinsic to the measurement. The amplitude of the periodic $\omega$-fluctuations, i.e., of the periodic fluctuations in the rotational velocity of the crankshaft, is thus used as the threshold of comparison, or baseline, in the determination of the irregular $\omega$-fluctuations. Whenever the value of the threshold is exceeded, a signal is issued which can be used directly for the engine regulation process.

The invention will be better understood, as well as further objects and advantages will become more apparent, from the ensuing detailed specification of a preferred, although exemplary, embodiment of the invention taken in conjunction with the drawing.

DESCRIPTION OF THE PREFERRED EMBODIMENT

Figure 1:
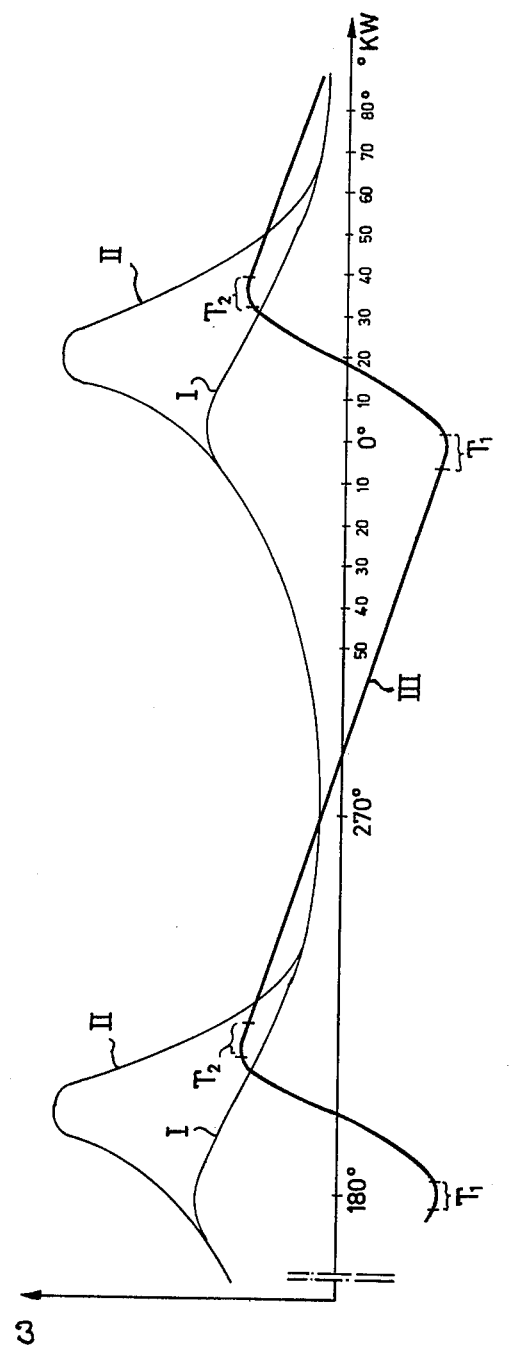
FIG. 1 is a set of curves showing the rotational velocity of the crankshaft and the pressure in the cylinder, respectively, as a function of the angular position of the crankshaft in a four-cylinder combustion engine.

A detailed elaboration of FIG. 1 is unnecessary, since it has already been given above. The measurement principle inherent in the invention is that the rotational velocity $\omega$ of the crankshaft is measured once when its value is at a minimum, and measured once again when its value is at its maximum, which occurs directly thereafter. The determination of the minimal $\omega$-value is made at the times T1 in FIG. 1, and since the measurement extends over a certain length of time, the result is an average value of the minimum rotational velocity during the time-span T1. Subsequently, an average value of the maximum rotational velocity during the time-span T2 is obtained. These two velocities are compared with each other, and it is clear that, during normal engine operation, the velocity in the time-span T2 must always be greater than the velocity in the time-span T1, so that the difference $\omega(T2) - \omega(T1)$ must always be positive; i.e., $\omega(T2) - \omega(T1) > 0$.

It should be added, in connection with the plot of the curves of the rotational velocity $\omega$ in FIG. 1, that the occurrence of the minima and maxima of $\omega$ remains substantially regular and constant at any rpm. Moreover, they remain constant as the rpm changes, so that the phase relationship of the minima and the maxima of the plotted curves of the $\omega$-fluctuations remains constant during undisturbed operating conditions, i.e., during the occurrence of only regular, periodic $\omega$-fluctuations.

It has been observed that, as the fuel-air mixture delivered to the combustion engine is made relatively leaner and leaner, and as the dynamic instability increases, the phase-relationships of the $\omega$-curve are disturbed, such that the value of $\omega$ at the time T2, which, like the time-point T1, is fixed, actually becomes less than that measured at the time T1. Thus, as the fuel-air mixture becomes increasingly lean, the difference $\omega(T2) - \omega(T1)$ becomes ever more frequently negative.

Figure 2:
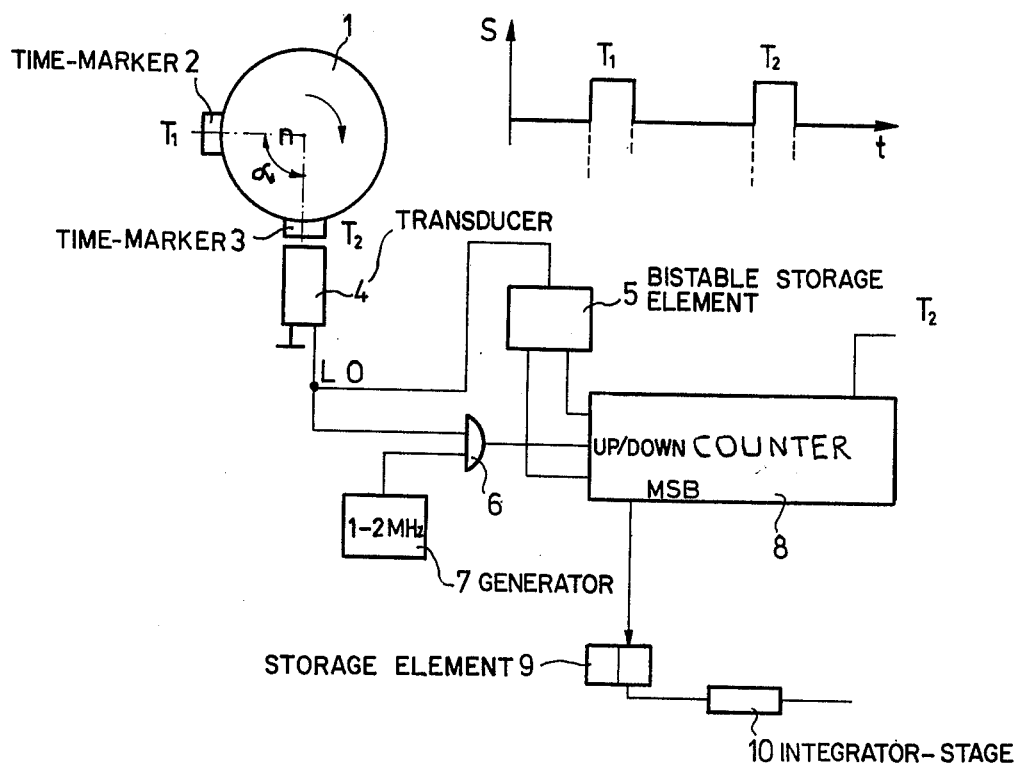
FIG. 2 is a schematic diagram of a preferred embodiment of an apparatus for the acquisition of a signal representative of dynamic instability (engine roughness)

A practical embodiment of a measuring apparatus according to the invention is shown in FIG. 2. A crankshaft 1 of an internal combustion engine has two time-markers 2 and 3, which are separated by a specific quantitatively drawn angle $\alpha$ (as measured from the center of one time-marker to the center of the other timemarker). The time-markers 2 and 3 each have a finite length, so that, during their passage past a transducer 4, the latter generates a signal whose duration is inversely proportional to the rotational velocity. This signal is shown in the upper right part of FIG. 2, plotted against time. This signal occurs during a given crankshaft angle and its duration varies as $1/n$.

In a practical embodiment, the starter ring gear of the engine, which has a multitude of gear teeth, may, for example, be utilized to form the time markers. The extent of each marker around the circumference of the crankshaft is fixed and can, for example, be equal to three or more gear teeth.

The crankshaft in FIG. 2 rotates in the direction of the arrow. When the front edge of the time-marker 2 passes the transducer 4, the latter generates a "1" signal, whereas, upon the passage of the rear edge of the time-marker, the transducer generates a logical "0" signal, and the same thing happens during the passage of the time-marker 3 past the same transducer 4. The output of the transducer is connected, firstly, to the input of a bi-stable storage element 5, for example a flip-flop, and, secondly, to one of the inputs of an AND-gate 6, whose other input receives a pulse sequence of a relatively high frequency, for example between 1 - 2 MHz, from a generator 7. The output of the AND-gate is connected to the counting-input of an Up/Down counter 8. The two outputs of the storage-flip-flop 5 are connected in such a way with the Up/Down counter that, depending on the particular state of the storage flip-flop 5, the Up/Down counter 8 counts the signal impulses received from the generator 7 in an upward, or in a downward direction.

The operation of this apparatus is easily understood and proceeds as follows: With the passage of the front edge of the time-marker 2 past the transducer 4, a logical "1" signal appears at the transducer output and switches the AND-gate 6 to the open, or transmitting, condition, so that the pulse sequence put out by the generator 7 now reaches the Up/Down counter, where it is up-counted, or added, since, in this case, the outputs of the storage flip-flop 5 are, by definition, set to cause an upward, or forward, count to take place in the Up/Down counter 8.

This counting process is stopped, in this case, with the passage of the rear edge of the time-marker 2 past the transducer 4. A further counting process is begun when the front edge of the time-marker 3 passes, except that, this time, the state of the flip flop 5 is being changed to that storage condition where, during the passage of the time-marker 3, and the corresponding time-span T2, the Up/Down counter counts the signal-impulse-sequence received from generator 7 in a downward, or backward, direction. In other words, the constant frequency pulses received by the Up/Down counter 8 during the time-span T2 are subtracted from pulses received by the Up/Down counter during the time span T1. Since the velocity at the time T2 is usually greater, as shown in FIG. 1, the corresponding time-marker 3 moves past the transducer 4 at a higher speed, so that the number of the pulses counted in the backward, or downward, direction ought, per se, to be smaller, than that counted in the forward direction and the difference, or remainder, would be arithmetically positive.

The above-mentioned phase-displacements, caused by making the mixture leaner, result in values which are sometimes negative, and this information is recorded, without additional or supplemental circuitry, by the Up/Down counter, due to the fact that the most significant bit (MSB) switches to a logical "1" when the downward count proceeds past zero.

It is evident from the foregoing that, during dynamic instability of the engine, a logical "1" appears ever more frequently as the MSB of the Up/Down counter 8. This bit may be exploited for example, by connecting a bistable element 9 to the highest counting position of the Up/Down counter. The output of element 9 also shows a "0" or a "1", corresponding to the output-signal ("1" or "0") of the highest counting position of the Up/Down counter 8. The output-signal "1" of the storage element 9 then feeds a subsequent integrator-stage 10, which generates a corresponding and suitable analog signal according to, and derived from, the frequency of occurrence of the "1" states. This analog signal may be directly used as a final control signal, or may, preferably, be used in the electronic fuel injection system for the adjustment, more specifically the elongation or abbreviation, of injection pulses via the multiplier-stage of the fuel-injection system.

The heart of the evaluating circuitry is the Up/Down counter 8, which, in a practical embodiment, was a 12-bit Up/Down counter; this counter was clocked by a 1 MHz signal.

The distance between the two time-markers 2 and 3, around the circumference of the crankshaft, is determined, of course, by the separation between the minima and maxima of the periodic fluctuations of the ω-curve. As shown in FIG. 1, the minima occur shortly prior to the top dead center, that is, near the zero degree position of the crankshaft, while the maxima occur approximately at a crankshaft angle of 35°–40°. Accordingly, the distance between the time-markers shown in FIG. 2, is 45°. The length of each marker, i.e., the distance between the front edge and the rear edge, is, of course, identical on both time-markers, so that any differences in the number of the pulses fed to the Up/Down counter 8 depend exclusively upon the particular momentary velocity of the crankshaft as the corresponding time-marker passes the transducer 4.

Figure 3:
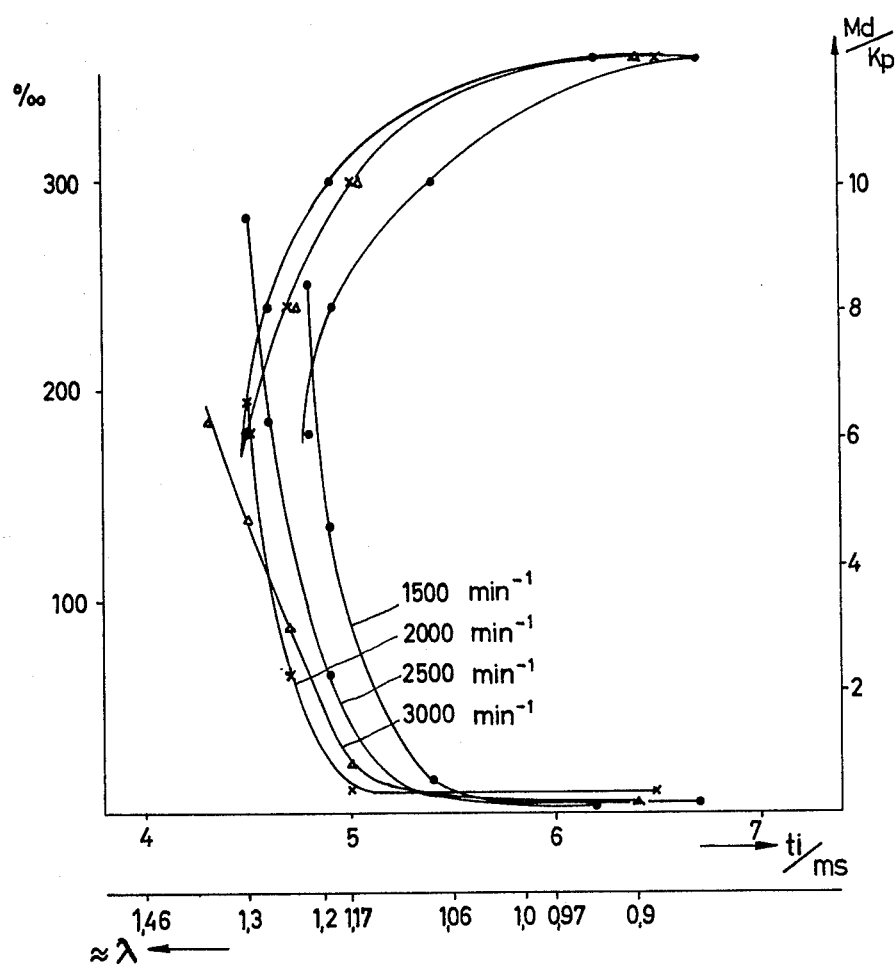
FIG. 3 is a simultaneous plot of curves of the changing torque and of the frequency of occurrence of the signal indication dynamic instability, per 1000 revolutions, both as a function of the air number $\lambda$, for different engine speeds.

Finally the diagram of FIG. 3, (left ordinate) represents, firstly, the frequency of occurrence of the "1"-signal, (corresponding to an increased dynamic instability during lean operation), plotted against the air number λ and against the corresponding duration of the fuel-injection pulse $t_i$. Secondly, the figure shows the torque (right ordinate) similarly plotted against air number λ and the $t_i$ signal, in each case for different rpm as a parameter. The abscissa bearing the air number λ is drawn beneath the axis denoting the duration of the injection pulses.

As may be seen from FIG. 3, beginning at a certain specific value in the lean operation, a relatively steep, rpm-dependent, rise in the frequency of occurrence of the "1"-signal takes place. This "1"-signal, physically present as the MSB of the Up/Down counter, thus becomes a measurement of the lean-running limit, based directly on a reference-value. The steep declines of the torque curves correspond to these λ- and rpm values; it is easy to recognize that the fluctuations in the combustion process and the delay in the ignition, which appear during a very lean operation, also adversely affect the crankshaft torque, at least at constant rpm.

A suitable switching circuit resets the Up/Down counter 8 after passage of the time-marker 3, i.e., immediately after the time-span T2, thus preparing the Up/Down counter for the subsequent counting cycle during the next rotation of the crankshaft.

As indicated earlier, a very particular advantage of the invention is that a reference-value comparison is accomplished automatically, and the fact that signals representative of dynamic instability, or engine roughness, which herald the operational limit within the region of air excess, can be generated with comperatively minor effort.

The switching circuit for resetting the up/down counter 8 may be a time delay circuit responsive to that storage condition of flip-flop 5 causing the up/down counter to count in a downward direction. Thus after a given short delayed time interval necessary for evaluating the counting state after time-span $T_2$, the counter is reset to zero. Alternatively the switching circuit can be made responsive to the trailing edge by differentiating pulse $T_2$ thereby resetting counter 8.

What is claimed is:

1. An apparatus for providing a signal for controlling an internal combustion engine, said engine including a rotating crankshaft and an electronic fuel injection system, comprising:
   marker means moving in step with the cyclic motion of said crankshaft;
   transducer means, for cooperation with said marker means to generate preferably inductively a datum related to the rotational speed of said crankshaft;
   frequency generator means, for generating a pulse train of constant frequency;
   counter means, clocked by said pulse train and gated by said datum;
   a bistable flip-flop controlled by said datum for defining the sense of counting of said counter means to provide for alternate counting in an arithmetically additive and subtractive sense;

an AND gate one of whose inputs receives said datum and the other of whose inputs is connected to receive said pulse train from said frequency generator means, the output of said AND gate being connected to the clock input of said counter means; and means connected to the counter means for providing an output control signal from the output of the counter means.

2. An apparatus for providing a signal for controlling an internal combustion engine, said engine including a rotating crankshaft and an electronic fuel injection system, comprising:

marker means moving in step with the cyclic motion of said crankshaft;

transducer means, for cooperation with said marker means to generate preferably inductively a datum related to the rotational speed of said crankshaft;

frequency generator means, for generating a pulse train of constant frequency;

counter means, clocked by said pulse train and gated by said datum;

means for defining the sense of counting of said counter means to provide for alternate counting in an arithmetically additive and subtractive sense; and further means connected to the counter means for providing an output control signal from the output of the counter means, said further means including a bistable switch and an integrating circuit connected thereto, and wherein the output of the highest counting stage (MSB) in said counter means is connected to the trigger input of said bistable switch.

3. An apparatus as defined by claim 2, wherein said integrator circuit is connected to the input of a multiplying circuit in said electronic fuel injection system, whereby the duration of fuel injection is changed resulting in enrichment or leaning out of the fuel-air mixture.

4. A process for determining a limiting value as an actual value which serves as an indication of the imminent approach to a predetermined lean running limit of an internal combustion engine, and thereby controlling the air-fuel mixture supplied to the engine, comprising the steps of:

measuring cranshaft rotational irregularity resulting from the combustion process during equal, rpm dependent changing time periods, which are determined by spaced markers arranged about the circumference of the engine crankshaft;

providing a first sequence of pulses to a digital counter for counting the pulses in said first sequence in an arithmetically additive sense; and providing a second sequence of pulses to the digital counter for counting the pulses in said second sequence in an arithmetically subtractive sense, whereby the resultant count is negative when the first sequence of pulses corresponds to the minimum angular speed fluctuation of the engine crankshaft due to a rotational irregularity, and the second sequence of pulses corresponds to the maximum angular speed fluctuation of the engine crankshaft due to the rotational irregularity, said resultant negative count being an approximation of the lean running limit of the engine producing the crankshaft rotational irregularity.

5. The process as defined in claim 4, further comprising the step of:

integrating said negative resultant count for use in controlling the duration of fuel injection impulses, and wherein:

(i) the delivery of the first sequence of pulses to the digital counter is initiated and subsequently terminated by the front and rear edges, respectively, of the lead marker, as viewed in the direction of rotation of the crankshaft; and (ii) the delivery of the second sequence of pulses to the digital counter is initiated and subsequently terminated by the front and rear edges, respectively, of the trailing marker, as viewed in the direction of rotation of the crankshaft.

6. An apparatus for determining a limiting value as an actual value which serves as an indication of the imminent approach to a predetermined lean running limit of an internal combustion engine, during regulation of the proportions of the air-fuel mixtures supplied to the internal combustion engine, comprising:

two spaced markers affixed to the engine crankshaft at a relative angular displacement determined by the natural minimum and maximum angular speed value of the crankshaft produced by the combustion process during a a single revolution of the crankshaft, said markers ensuring equal measurements during equal time periods at a given rpm;

an Up/Down counter for upward and downward counting of pulses generated during the effective periods of the two markers, and producing a negative resulatnt count when a crankshaft rotational irregularity exists due to lean running of the engine; and an integrator for integrating the negative resultant count and producing a signal which controls the ratio of the air-fuel mixture supplied to the engine.

7. An apparatus as defined by claim 6, further comprising:

means for resetting said counter after passage of the rear edge of one of said marker means.

* * * * *